United States Patent
Cote et al.

(10) Patent No.: US 6,303,035 B1
(45) Date of Patent: *Oct. 16, 2001

(54) IMMERSED MEMBRANE FILTRATION PROCESS

(75) Inventors: Pierre Cote, Dundas; Hamid Rabie, Mississauga; Steven Pederson, Burlington; Nicholas Adams, Hamilton, all of (CA)

(73) Assignee: Zenon Environmental Inc., Oakville (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/425,236

(22) Filed: Oct. 25, 1999

Related U.S. Application Data

(60) Provisional application No. 60/146,154, filed on Jul. 30, 1999.

(51) Int. Cl.⁷ ............................. B01D 61/00; B08B 3/08
(52) U.S. Cl. ............ 210/636; 210/650; 210/321.69; 134/3; 134/10; 134/103.1; 134/198.1
(58) Field of Search ............... 210/636, 321.79, 210/321.8, 321.69, 333.1, 333.01, 650; 134/3, 29, 28, 10, 27

(56) References Cited

U.S. PATENT DOCUMENTS

| | | |
|---|---|---|
| 5,393,433 | 2/1995 | Espenan et al. . |
| 5,403,479 | 4/1995 | Smith et al. . |
| 5,607,593 | * 3/1997 | Cote et al. . |
| 5,643,455 | * 7/1997 | Kopp et al. . |
| 5,647,988 | * 7/1997 | Kawanishi et al. .......... 210/636 |
| 5,783,083 | * 7/1998 | Henshaw et al. . |
| 5,944,997 | * 8/1999 | Pedersen et al. . |
| 5,958,243 | * 9/1999 | Lawrence et al. ............ 210/636 |
| 6,045,698 | * 4/2000 | Cote et al. . |

FOREIGN PATENT DOCUMENTS

| | | |
|---|---|---|
| 19960939147 | 11/1996 | (EP) . |
| 2741280 | 5/1997 | (FR) . |
| 52156176 | 12/1977 | (JP) . |
| 4131182 | 5/1992 | (JP) . |
| 04131182 | 8/1992 | (JP) . |
| 5184884 | 7/1993 | (JP) . |
| 6277664 | 10/1994 | (JP) . |
| 07047245 | 2/1995 | (JP) . |
| 07116482 | 5/1995 | (JP) . |
| 07136474 | 5/1995 | (JP) . |
| 08099025 | 4/1996 | (JP) . |
| 8099025 | 4/1996 | (JP) . |

(List continued on next page.)

OTHER PUBLICATIONS

Derwent Publications Ltd., XP002153239.
Derwent Publications Ltd., XP002153240.
Derwent Publicatons Ltd., XP002153241.

(List continued on next page.)

Primary Examiner—Ana Fortuna
(74) Attorney, Agent, or Firm—Bereskin & Parr

(57) ABSTRACT

A filtration process for filtering water with immersed microfiltration or ultrafiltration membranes in a batch mode includes repeated cycles comprising the steps of filling the tank to a level above the membranes, withdrawing permeate through the membranes, aerating the membranes to dislodge solids from the membranes and backwashing the membranes while draining the tank. The backwashing steps involve backwashings with a cleaning chemical interspersed with backwashings with permeate. The backwashings with a cleaning chemical follow a regimen of maintenance cleaning chosen to maintain acceptable permeability of the membranes or to reduce the rate of decline in permeability of membranes 24 over extended periods of time.

4 Claims, 3 Drawing Sheets

FOREIGN PATENT DOCUMENTS

| | | |
|---|---|---|
| 08229362 | 9/1996 | (JP) . |
| 08252438 | 10/1996 | (JP) . |
| 8281082 | 10/1996 | (JP) . |
| 9052026 | 2/1997 | (JP) . |
| 09075689 | 3/1997 | (JP) . |
| 10015365 | 1/1998 | (JP) . |
| 10066844 | 3/1998 | (JP) . |
| 10118470 | 5/1998 | (JP) . |
| 11019488 | 1/1999 | (JP) . |
| 11128920 | 5/1999 | (JP) . |
| WO 97/18887 * | 5/1997 | (WO) . |
| WO 98/28066 | 2/1998 | (WO) . |

OTHER PUBLICATIONS

Derwent Publications Ltd., XP002153127.
Derwent Publications Ltd., XP002153128.
Derwent Publications Ltd., XP002153129.
Derwent Publications Ltd., XP002153130.
Derwent Publications Ltd., XP002153131.
Derwent Publications Ltd., XP002153132.
"Membrane News", Section 4/35 in Situ Cleaning Method of Immersion Type Membrane Filtration System: Jan. 1997, p. 16.
"Membrane News", Section 4.43 Immersion Type Membrane Separation System: Jan. 1997, p. 18–19.
"Membrane News", Section 4.47.1 Submarine Type Membrane Separator and Membrane Cleaning Method of the Same: Dec. 1997, p. 31.
"Membrane News", Section 4.54 Chemical Cleaning Method and System of Immersion Type Membrane Filter: Jan. 1997, p. 22.
"Membrane News", Section 4.56 Cleaning Method of Membrane Module: Jun. 1997, p. 19.
"Membrane News", Section 5.28 Immersion Type Membrane Separator: Aug. 1995, p. 14.
"Membrane News", Section 4.12.3 Chemical Cleaning Method of Submarine Type Ceramic Membrane Separation System: Mar. 1998, p. 13.
"Membrane News", Section 4.24 Cleaning Method of Immersion Type Membrane Filter: p. 13.
"Membrane News", Section 4.30 Membrane Separations Method: Sep. 1996, p. 16.
"Membrane News", Section 4.34 Immersion Type Membrane Separation System: Jan. 1997, p. 16.

* cited by examiner

IMMERSED MEMBRANE FILTRATION PROCESS

This application claims the benefit under 35 U.S.C. of provisional application 60/146,154 filed Jul. 30, 1999.

FIELD OF THE INVENTION

This invention relates to filtering water using immersed ultrafiltration and microfiltration membranes and in particular to a process for filtering water in a batch mode with a suitable chemical cleaning regimen.

BACKGROUND OF THE INVENTION

Immersed membranes are used for separating a permeate lean in solids from tank water rich in solids. Typically, filtered permeate passes through the walls of the membranes under the influence of a transmembrane pressure differential between a retentate side of the membranes and a permeate side of the membranes. Solids in the tank water are rejected by the membranes and remain on the retentate side of the membranes. Despite the apparent simplicity of this process, however, two related issues have proven to be consistently difficult to address. The first issue relates to controlling the concentration of solids in the tank water. The second issue relates to the need to clean the membranes to prevent their rapid and sometimes irreversible loss of permeability.

Controlling the Concentration of Solids in the Tank Water

Feed water flowing into a tank containing immersed membranes has an initial concentration of solids. As filtered water is permeated through the membranes and removed from the system, the solids are rejected and accumulate in the tank. These solids must be removed from the tank in order (a) to preserve a mass balance and (b) to prevent rapid fouling of the membranes which occurs when the membranes are operated in water containing a high concentration of solids.

One method of removing solids from the tank is to have a continuous bleed of tank water, which may be called retentate. Unfortunately, while this process preserves a mass balance, the tank water must contain a high concentration of pollutants or the process will generate large volumes of retentate.

For example, if a continuous bleed process is operated at a recovery rate of 95% (ie. 95% of the feed water becomes filtered permeate), only 5% of the feed water leaves the tank as retentate. To preserve a mass balance of solids, the retentate must have a concentration of pollutants 20 times that of the feed water. The concentration of solids in the retentate, however, is the same as the concentration of solids in the tank since the retentate is drawn from the tank water. Accordingly, the tank water has a high concentration of pollutants at all times. Operating at a lower recovery rate, 80% for example, results in tank water having a lower concentration of solids but the cost of transporting excess feedwater and then disposing of excess retentate also increases.

Another process involves filtering in a batch mode. For example, PCT Publication No. WO 98/28066 describes a process in which retentate is not withdrawn continuously. Instead, the tank water is drained to remove the accumulated solids at discrete intervals. The tank is then refilled with fresh feed water and operation continues. While regular operation is interrupted in this method, there is a period directly after the tank is refilled in which the membranes are operated in relatively solids lean tank water. For feed water with low suspended solids, the intervals between drainings may be long enough that the benefit gained by emptying the tank offsets the loss in production time. Unfortunately, however, the potential gain in output during the period directly after the tank is re-filled is often not realized because, regardless of the concentration of solids in the tank water generally, the tank water adjacent the membranes can quickly become rich in solids as permeate is withdrawn through the membranes.

Cleaning the Membranes

As filtered water is permeated through the membranes, solids foul the surface of the membranes. The rate of fouling is related to the concentration of solids in the tank water and can be reduced but not eliminated. Further, the solids may be present in the feed water in solution, in suspension or as precipitates and may further include a variety of substances, some not actually solid, including colloids, microorganisms, exopolymeric substances excreted by microorganisms, suspended solids, and poorly dissolved organic or inorganic compounds such as salts, emulsions, proteins, humic acids, and others. All of these solids can contribute to fouling but the fouling may occur in different ways. Fouling can also occur at the membrane surface or inside of the pores of the membrane. To counter the different types of fouling, many different types of cleaning regimens may be required. Such cleaning usually includes both physical cleaning and chemical cleaning.

The most frequently used methods of physical cleaning are backwashing and aeration. In backwashing, permeation through the membranes is stopped momentarily. Air or water are flowed through the membranes in a reverse direction to physically push solids off of the membranes. In aeration, bubbles are produced in the tank water below the membranes. As the bubbles rise, they agitate or scrub the membranes and thereby remove some solids. These two methods may also be combined. For example, PCT Publication No. WO 98/28066, mentioned above, describes a process in which permeation continues for 15 minutes and then stops while the membranes are aerated for 2 minutes and 15 seconds. After the first minute of aeration, the membranes are backwashed for 15 seconds. After the aeration and backwashing, permeation resumes. Accordingly, a process cycle of 17 minutes and 15 seconds yields 15 minutes (or 87% of the cycle time) of permeation. These cycles are repeated several times between tank drainings.

Such back washing and agitation is partially effective in removing solids from the surface of the membranes, but is not very effective for removing solids deposited inside the membrane pores and is almost ineffective for removing any type of solid chemically or biologically attached to the membranes. Accordingly, fouling continues despite regular physical cleaning. This continued fouling is countered by cleaning with a chemical cleaner. For example, the membranes may be soaked in one or more cleaning solutions either in the process tank (after it has been drained and filled with chemical cleaner) or in a special cleaning tank. These methods, however, require either large volumes of chemical cleaner (to fill the process tank) or the expense of providing special cleaning tanks and means to move the membranes to the cleaning tank. These methods also disrupt permeation for extended periods of time.

Other methods involve backwashing the membranes with a chemical cleaner. Examples of such methods are described in U.S. Pat. No. 5,403,479 and Japanese Patent Application No. 2-248,836 in which chemical cleaning is performed without draining the tank or removing the membranes from the tank. Permeation is stopped and the membranes are cleaned by flowing a chemical cleaner in a reverse direction through the membranes while the membranes are simultaneously agitated. Although effective, these methods leave residual chemicals in the tank. In wastewater applications, the chemicals interfere with useful biological processes in the tank water. In drinking water applications, the chemicals pass through the membranes when permeation is resumed resulting in unwanted concentrations of chemicals in the permeate. Further, some chemical cleaner disperses in the tank water during the cleaning event thus increasing the amount of chemical cleaner required.

French Patent No. 2,741,280 describes another method of backwashing membranes with a chemical cleaner. In this method, the tank water is drained before the chemical backwash begins. When the chemical backwash is over, the cleaner is drained from the tank and the tank is refilled. In this way, the chemical cleaner does not contaminate the tank water or permeate. The time required for the backwash, however, is at least 30 minutes which is a significant disruption to the process. Further, in a typical municipal installation the tank may range from 1 m to 10 m in depth. The chemical cleaner inside the lower membranes or the lower portions of vertical membranes may thus be subject to a local pressure up to 100 kPa higher than the local pressure of the chemical cleaner inside the upper membranes or the upper portions of vertical membranes. Since the flow of chemical cleaner through the membranes is dependant on the local pressure of the chemical cleaner inside the membranes, the flow rate of chemical cleaner varies considerably between the upper and lower membranes. As a result, either insufficient cleaner is supplied to the upper portions of the membranes or excess cleaner is supplied to the lower portions of the membranes.

SUMMARY OF THE INVENTION

An object of the present invention is to provide a process for filtering water using immersed membranes in a batch mode and to provide a physical and chemical cleaning regime for use with the process.

In some aspects, the invention is directed at a filtration process for filtering water with immersed microfiltration or ultrafiltration membranes. The process includes repeated cycles comprising the steps of: filling the tank to a level above the membranes; withdrawing permeate through the membranes; aerating the membranes to dislodge solids from the membranes; and backwashing the membranes and draining the tank. Preferably, the steps of backwashing the membranes and draining the tank are performed at least partially simultaneously. At least some of the backwashing steps involve backwashings with a cleaning chemical. The remaining backwashing steps, if any, are backwashings with permeate. The backwashings with a cleaning chemical follow a regime of maintenance cleaning involving repeated short cleaning events chosen to maintain acceptable permeability of the membranes or to reduce the rate of decline in permeability of the membranes over extended periods of time.

BRIEF DESCRIPTION OF THE DRAWINGS

Preferred embodiments of the invention will now be described with reference to the following figure or figures.

DETAILED DESCRIPTION OF THE INVENTION

Figure 1:
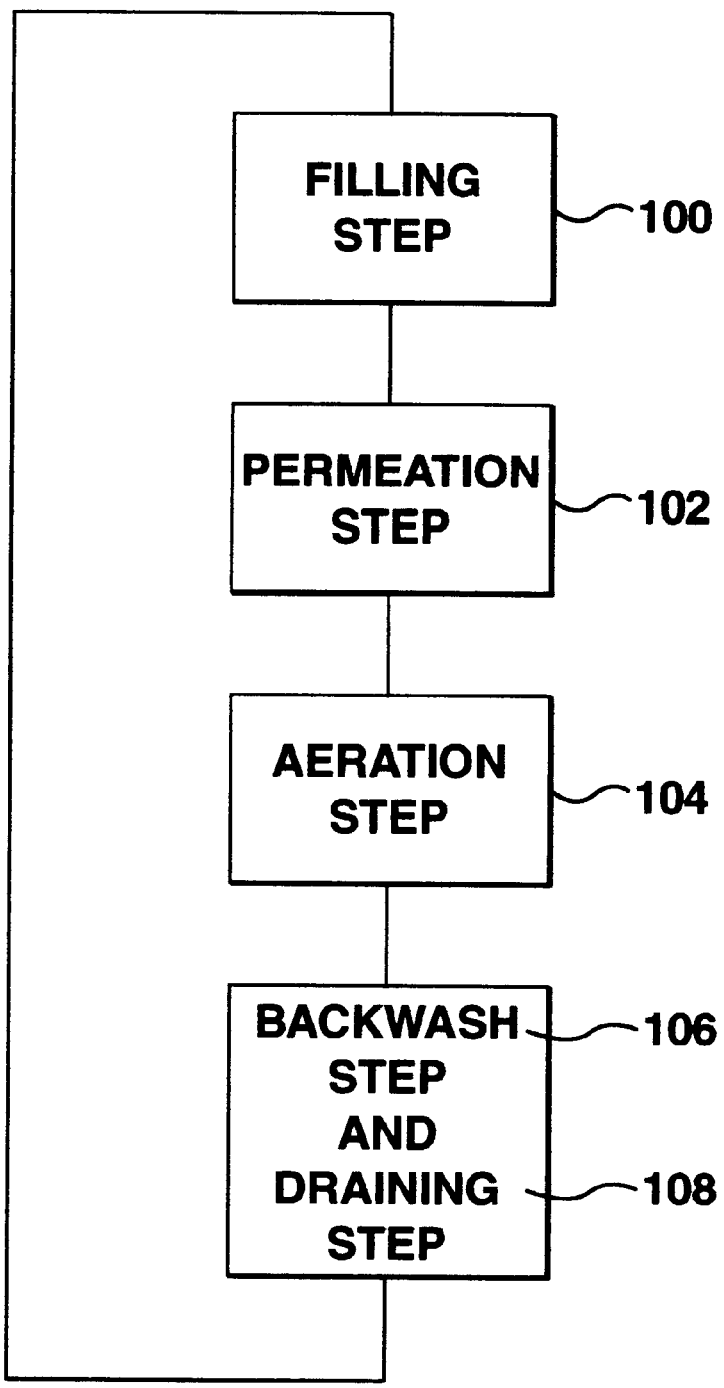
FIG. 1 is a flow diagram of a process according to an embodiment of the invention.
Figure 2:
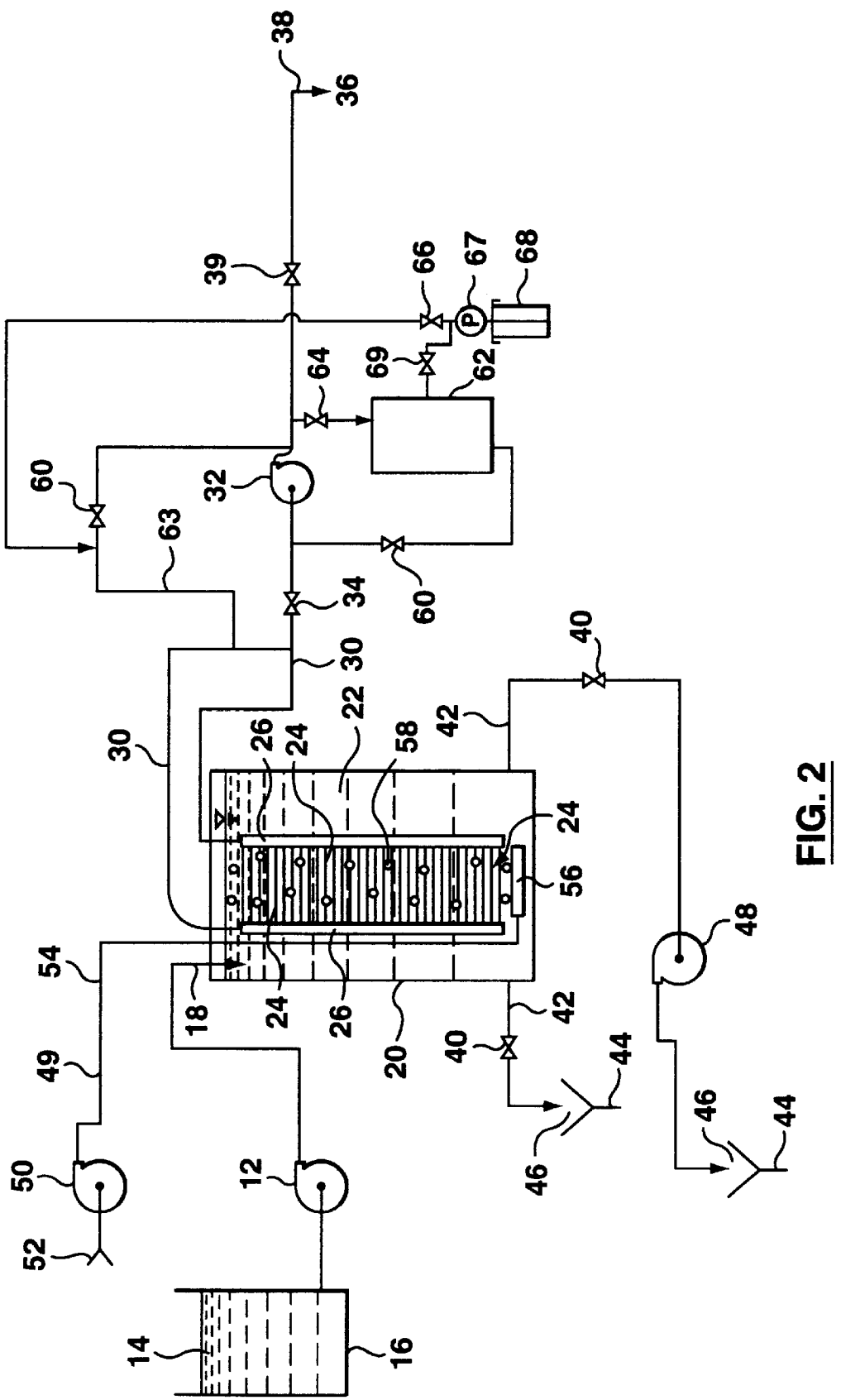
FIG. 2 is a schematic diagram of an apparatus suitable for use with the process of FIG. 1.

Referring now to FIG. 1, a filtration process for filtering water with immersed membranes has a filling step 100, a permeation step 102, an aeration step 104, a backwash step 106 and a draining step 108. These steps form a cycle which is repeated for continued filtration. Each step will be described in greater detail below with reference to FIGS. 1 and 2 except where noted.

Filling Step 100

In the filling step 100, a feed pump 12 pumps feed water 14 from a water supply 16 through an inlet 18 to a tank 20 where it becomes tank water 22. The tank 20 is filled when the level of the tank water 22 completely covers one or more membranes 24 in the tank 20.

Permeation Step 102

Each membrane 24 has a permeate side which does not contact tank water 22 and a retentate side which does contact the tank water 22. Membranes 24 made of hollow fibres with an average pore size in the microfiltration or ultrafiltration range, preferably between 0.003 microns and 10 microns, are preferred and will be described in this application although other suitable configurations are available. The membranes 24 are attached to headers 26 to produce a watertight connection between the retentate of the membranes 24 and the headers 26 while keeping the permeate sides the membranes 24 in fluid communication with at least one conduit in at least one header 26. The membranes 24 and headers 26 together form a membrane module 28 which may be purchased from several manufacturers. The conduit or conduits of the headers 26 are connected to a permeate collector 30 and a permeate pump 32 through a permeate valve 34. A plurality of membrane modules 28 (not shown) may be connected to a common permeate collector 30.

During the permeation step 102, drain valves 40 remain closed. The permeate valve 34 and an outlet valve 39 are opened and the permeate pump 32 is turned on. A negative pressure is created on the permeate side of the membranes 24 relative to the tank water 22 surrounding the membranes 24. The resulting transmembrane pressure, typically between 1 kPa and 150 kPa, draws tank water 22 (then referred to as permeate 36) through the membranes 24 while the membranes 24 reject solids which remain in the tank water 22. Thus, filtered permeate 36 is produced for use at a permeate outlet 38. Periodically, a storage tank valve 64 is opened to admit permeate 36 to a storage tank 62. The filtered permeate 36 may require post treatment, before being used as drinking water for example, but should have acceptable levels of solids. As filtered permeate 36 is removed from the tank, the feed pump 12 is operated to keep the tank water 22 at a level which covers the membranes 24.

The permeation step 102 typically continues for between 15 minutes and three hours, preferably between 45 minutes and 90 minutes. During this time, solids accumulate in the tank water 22 and permeability of the membranes 24 decreases as the membranes 24 foul. The end of the permeation step can be determined by the membranes 24 dropping to a preselected permeability, but is more typically determined by selecting a desired recovery rate, typically over 90%. For example, for a recovery rate of 95% permeation continues until a volume of permeate approximately 19 times the volume of the tank has been produced. At this time, the permeation step 102 is ended. The permeate pump 32 and feed pumps 12 are turned off and the permeate valve 34 and outlet valves 39 are closed.

Aeration Step 104

Aeration is provided by an aeration system 49 having an air supply pump 50 which blows air, nitrogen or other appropriate gas from an air intake 52 through air distribution pipes 54 to one or more aerators 56 located generally below the membrane modules 28 which disperse air bubbles 58 into the tank water 22. The air bubbles 58 create an air-lift effect causing tank water 22 to flow upwards past the membranes 24, mixing the tank water 22 near the membranes 24 with the tank water 22 generally.

The amount of aeration to provide is dependant on numerous factors but is preferably related to the superficial velocity of air flow through the aerators 56. The superficial velocity of air flow is defined as the rate of air flow to the aerators 56 at standard conditions (1 atmosphere and 25 degrees celsius) divided by the cross sectional area effectively aerated by the aerators 56.

In the aeration step 104, aeration is provided by operating the air supply pump 50 to produce air corresponding to a superficial velocity of air flow between 0.005 m/s and 0.15 m/s for up to two minutes. This extended period of intense aeration creates a strong air lift and agitates and scrubs the membranes 24 to dislodge solids from them and disperses the dislodged solids into the tank water 22 generally. At the end of the aeration step 104, the air supply pump 50 is turned off.

For feed water 14 having minimal fouling properties, aeration in the aeration step 104 is all that is required. For some feed waters having more significant fouling properties, however, gentle aeration is also provided during the permeation step 102 to disperse the solids in the tank water 22 near the membranes 24. This gentle aeration is not intended to dislodge significant amounts of solids from the membranes 24 but to prevent the tank water 22 adjacent the membranes 24 from becoming overly rich in solids as permeate is withdrawn through the membranes 24. Accordingly, such aeration is not considered part of the aeration step 104. For gentle aeration, air may be provided continuously at a superficial velocity of air flow between 0.0005 m/s and 0.015 m/s or intermittently at a superficial velocity of air flow between 0.005 m/s and 0.15 m/s.

Backwash Step 106

In the backwash step 106, two types of backwashing may be used—permeate or chemical. For permeate backwashing, backwash valves 60 and storage tank valve 64 are opened. Permeate pump 32 is turned on to push filtered permeate 36 from storage tank 62 through a backwash pipe 63 to the headers 26 and through the walls of the membranes 24 in a reverse direction thus pushing away some of the solids attached to the membranes 24. At the end of the backwash, backwash valves 60 are closed. As an alternative to using the permeate pump 32 to drive the backwash, a separate pump can also be provided in the backwash line 63 which may then by-pass the permeate pump 32. By either means, the backwashing continues for between 15 seconds and one minute after which time the backwash step 106 is over. Permeate pump 32 is then turned off and backwash valves 60 closed.

As mentioned earlier, permeate backwashing and aeration do not effectively inhibit all types of fouling, particularly fouling caused by solids deposited inside the membrane pores and solids chemically or biologically attached to the membranes. This type of fouling is countered by replacing some or all of the permeate backwashings with chemical backwashings. For chemical backwashing, a chemical valve 66 is opened and a chemical pump 67 turned on to flow chemical cleaner from a chemical tank 68 to backwash line 63 connected to headers 26 and thus to the membranes 24. Alternatively, backwash valves 60 are opened and permeate pump 32 operated to push filtered permeate 36 from permeate tank 62 through backwash line 63 to the headers 26. Chemical valve 66 is opened and chemical pump 67 turned on mixing chemical cleaner from chemical tank 68 with permeate 36 flowing through backwash line 63. Further alternatively, backwash valves 60 and a cross flow valve 69 are also opened connecting the chemical tank 68 to the permeate tank 62. Chemical pump 67 delivers chemical cleaner to permeate tank 62. Permeate pump 32 is then operated to deliver the chemical cleaner to the membranes 24. Chemical cleaners could also be introduced directly to the headers 26 or the permeate collector 30 which may reduce the total volume used or allow alternate delivery mechanisms.

The permeate pump 32 or chemical pump 67, whichever governs, is controlled to feed the cleaning chemical into the membranes 24 with sufficient pressure to produce a flux of chemical through the membranes 24 between 8.5 L/m²/h and 51 L/m²/h. New chemical cleaner is added to the chemical tank 68 as needed. After the chemical cleaning is completed, chemical pump 67 is turned off and chemical valve 66 or cross flow valve 69 are closed. Preferably, the backwash valves 60 are opened and permeate pump 32 operated to provide a rinsing backwash to remove chemical cleaner from the backwash line 63 and permeate collectors 30.

Draining Step 108

In the draining step, the drain valves 40 are opened to allow tank water 22, then containing a high concentration of solids and called retentate 46, to flow from the tank 20 to through a retentate outlet 42 to a drain 44. The retentate pump 48 may be turned on to drain the tank more quickly, but in many installations the tank will empty rapidly enough by gravity alone. In most industrial or municipal installations it typically takes between two and ten minutes and more frequently between two and five minutes to drain the tank 20,completely.

Relationship Between the Backwash Step 106 and the Draining Step 108

The backwash step 106 and draining step 108 are shown in the same box in FIG. 1 to indicate that they can be performed either before the other but preferably occur partially or substantially simultaneously. For permeate backwashes, the membranes 24 begin to be backwashed preferably substantially at the same time as the drain valves 40 are opened sp that the permeate backwash does not result in an additional loss in permeate production time. If the backwash flux exceeds the draining flux to the point where the tank 20 would overflow, however, the start of the backwash may be delayed accordingly. After the permeate backwash is over, the drain valves 40 are left open to drain the remaining contents of the tank 20. Once the tank 20 is empty, drain valves 40 are closed and a new cycle begins.

Chemical backwashes also preferably begin substantially at the same time as the drain valves 40 are opened. The duration of the chemical backwash is also preferably chosen to be similar to the time that it takes to drain the tank 20 completely so that the backwash step 106 and draining step 108 are substantially simultaneous. By having the chemical backwash coincide with draining the tank 20, permeate production time is saved (as in the case of the permeate backwash) by having two operations performed at once. In addition, dilution of the cleaning chemical into the tank water occurs only from the portion of membranes 24 or parts of membranes 24 (where the membranes 24 are vertical) covered in tank water, which proportion continually decreases during the backwash. Further, the upper membranes 24 or parts of membranes 24 receive as much chemical as the lower membranes 24 or parts of membranes 24 at least near the beginning of the backwash when the tank water 22 provides a greater head against the lower membranes 24. Thus, the inventors believe that the chemical backwash while draining is at least comparable in effect to backwashing into either a full or empty tank 20 but advantageously makes use of the time taken to drain the tank 20. Once the tank 20 is empty of both tank water 22 and chemical cleaner, drain valves 40 are closed and a new cycle begins.

To determine how often to perform a chemical backwash, a cleaning regimen is first developed. Surprisingly, limiting the duration of each chemical backwash to a few minutes provides for an effective cleaning regimen which may be referred to as a form of maintenance cleaning. In maintenance cleaning, the goal is to reduce the rate of loss of permeability of the membranes 24 so that the membranes 24 can be used for extended periods of time before requiring an intensive restorative cleaning. In this regimen, the chemical backwashes are started before permeability of the membranes 24 drops significantly and preferably within days of when permeation is started with new membranes 24 or membranes 24 that have just been through intensive recovery cleaning.

To develop a specific cleaning regimen, a chemical cleaner is first chosen. The chemical cleaner used may be any chemical appropriate for the application and not overly harmful to the membranes 24. Typical chemicals include oxidants such as sodium hypochlorite, acids such as citric acid and bases such as sodium hydroxide. The chemical cleaner may be used in a non-liquid form such as by flowing chemical in a gaseous state to the headers 26 or introducing it as a solid into the backwash line 63. Liquid chemical cleaners are preferred, however, because they are easier to handle and inject in the proper amounts.

To determine the effectiveness of each chemical backwash, a parameter "CT" is calculated by multiplying the concentration of the cleaning chemical by the duration of the chemical backwashes. In possible alternative embodiments, the chemical cleaner may be diluted before it reaches the membranes 24. The concentration of the chemical cleaner is therefore measured as the chemical cleaner meets the permeate side 25 of the membranes 24. A typical chemical cleaner is NaOCl at a concentration between 20 and 200 mg/L A weekly CT is chosen to maintain acceptable permeability of the membranes 24 or to reduce the rate of decline in permeability of membranes 24 over extended periods of time, preferably between 15 days and three months. The weekly CT is typically in the range of 2,000 minute•mg/L to 20,000 minute•mg/L and preferably between 5,000 minute•mg/L and 10,000 minute•mg/L when NaOCl is the chemical cleaner and the permeate is intended for drinking water. When other chemical cleaners are used, the concentration of the chemical cleaner is expressed as an equivalent concentration of NaOCl that has similar cleaning efficacy. For example, for citric acid preferred values are approximately 20 times those given for NaOCl and for hydrochloric acid preferred values are approximately 4 times the values given for NaOCl. Dividing the weekly CT by the CT for each chemical backwash gives the number of chemical backwashes required per week. This number of chemical backwashes is distributed generally evenly over the entire number of backwashes expected for the week. The frequency of chemical backwashes typically ranges from once per cycle to once per day.

EXAMPLE

A small membrane module of horizontal hollow fibre membranes having approximately 28 $m^2$ of surface area was operated in repeated cycles. Each cycle had the following steps:

1. permeation for 2 hours with gentle aeration at a superficial velocity of 0.001 m/s;
2. aeration for two minutes at a superficial velocity of out 0.008 m/s;
3. drain tank and backwash with 10–20 ppm chlorine for 3 minutes (note: since the tank was small, draining the tank finished before backwashing);
4. re-fill tank.

Figure 3:
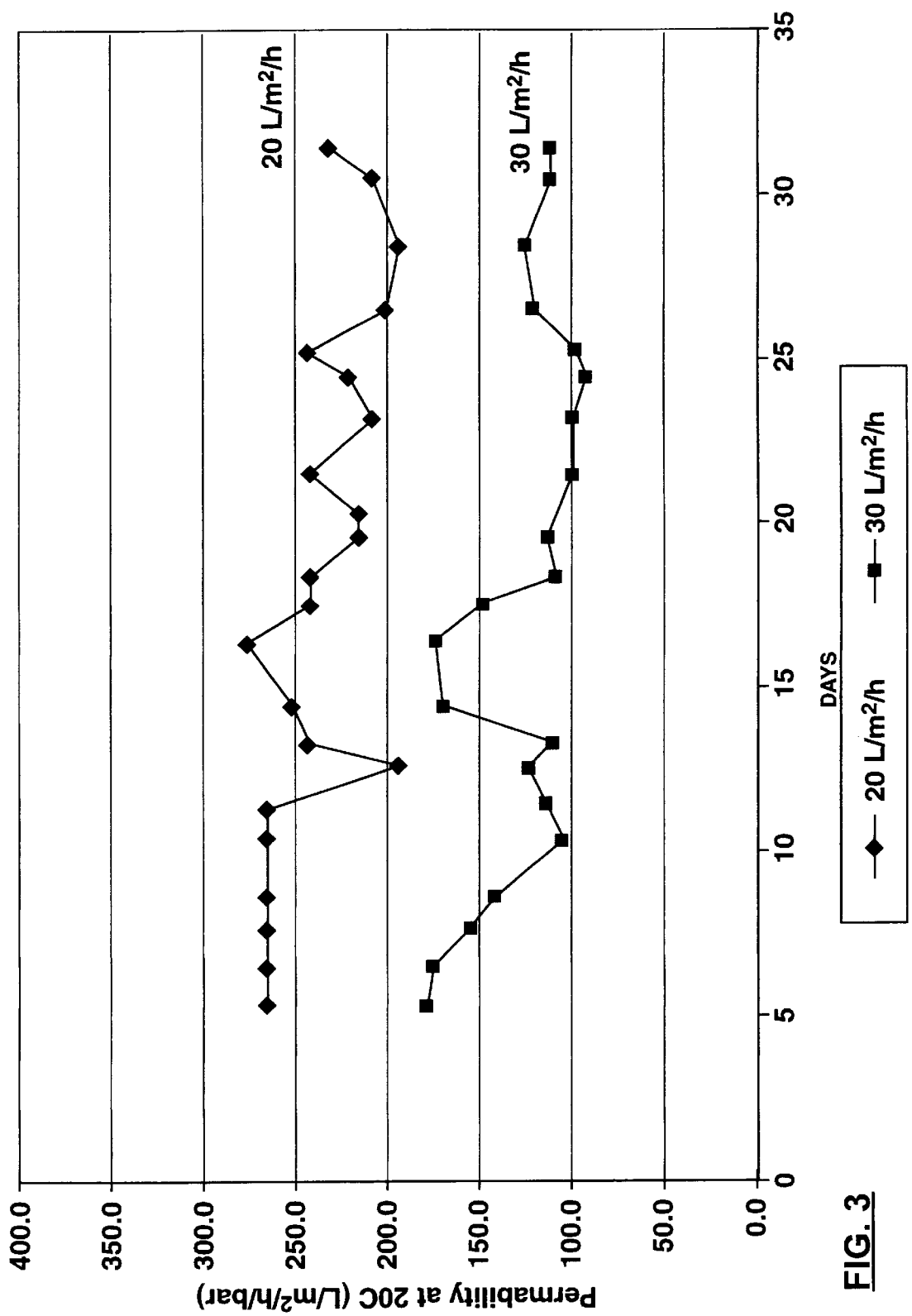
FIG. 3 is a graph showing the permeability of membranes used to filter water according to an embodiment of the present invention over time.

The feed water was from a lake and had a pH of 7.5, a temperature of 20C, turbidity of 10–15 ntu and TOC of about 5–8 mg/L. The process was run for over 30 days at a 95% recovery rate at two different permeate fluxes–20 $L/m^2/h$ and 30 $L/m^2/h$. FIG. 3 shows the permeability of the membranes over time at each permeate flux.

It is to be understood that what has been described are preferred embodiments of the invention. If the invention nonetheless is susceptible to certain changes and alternative embodiments without departing from the subject invention, the scope of which is defined in the following claims.

We claim:

1. A process for filtering water containing solids with membranes in a tank comprising the steps of:

a) filling the tank with a feed water to be filtered to immerse the membranes;

b) creating a transmembrane pressure between a permeate side and a retentate side of the membranes, the retentate side of the membranes being in contact with the water in the tank, the permeate side bring fluidly connected to a filtered permeate outlet, to generate a filtered permeate at the permeate outlet;

c) aerating the membranes to dislodge solids from the membrane;

d) backwashing the membrane;

e) draining the tank for between 2 and 10 minutes; and f) performing the steps above in repeated cycles wherein, g) the step of backwashing the membranes in some or all of the cycles involves backwashing the membranes with a cleaning chemical; and h) the steps of backwashing the membranes with a cleaning chemical in a cycle begins at substantially the same time as the step of draining the tank in that cycle and lasts for a time similar to the time taken for the step of draining the tank in that cycle such that the steps of backwashing the membranes with a chemical and draining the tank are substantially simultaneous, and a portion or part of the water covering the membranes in the tank continuously decreases during the step of backwashing the membranes with a chemical cleaning.

2. The method of claim 1 wherein the step of backwashing the membranes with a cleaning chemical is performed at least once a day.

3. The method of claim 1 wherein
   a) the steps of backwashing the membranes with a cleaning chemical are started before permeability of the membranes drops significantly; and
   b) the steps of backwashing the membranes with a cleaning chemical involve backwashing with a cleaning chemical having a selected concentration for a selected duration and the sum of the products of the concentration of the cleaning chemical and the duration of the steps of backwashing with a cleaning chemical performed in a week is selected to maintain an acceptable permeability or reduce the rate of decline in permeability of the membranes over extended periods of time.

4. The invention of claim 3 wherein the sum of the products of the concentration of the cleaning chemical and the duration of the steps of backwashing with a cleaning chemical performed in a week is between 2,000 min•mg/l and 20,000 min•mg/l when NaOCl is the cleaning chemical or an equivalent product of concentration and time of another cleaning chemical.

* * * * *